Aug. 12, 1941.   A. P. LOFSTRAND   2,252,346
GRAIN SHOCKER
Filed April 23, 1940   3 Sheets-Sheet 1
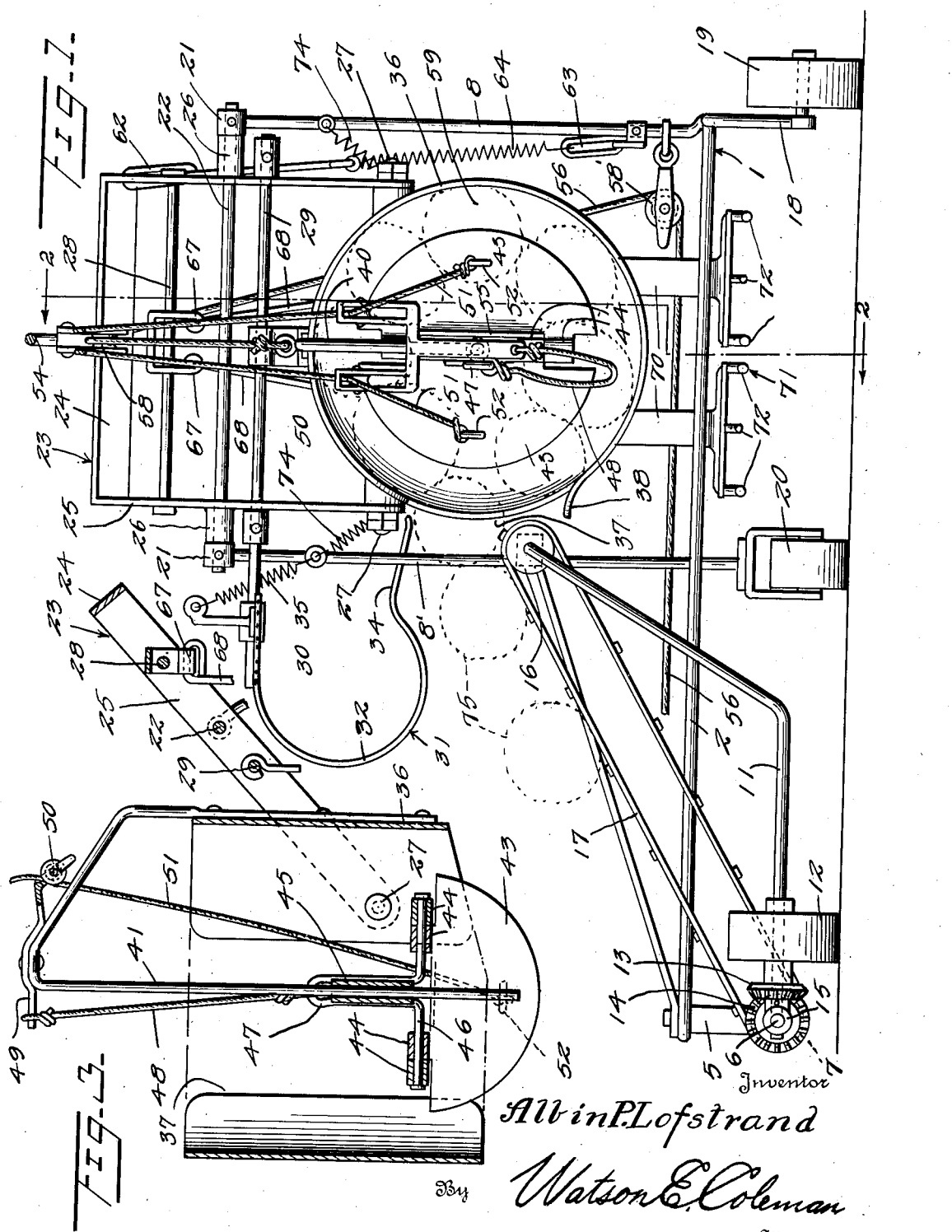
Inventor
Albin P. Lofstrand
By Watson E. Coleman
Attorney

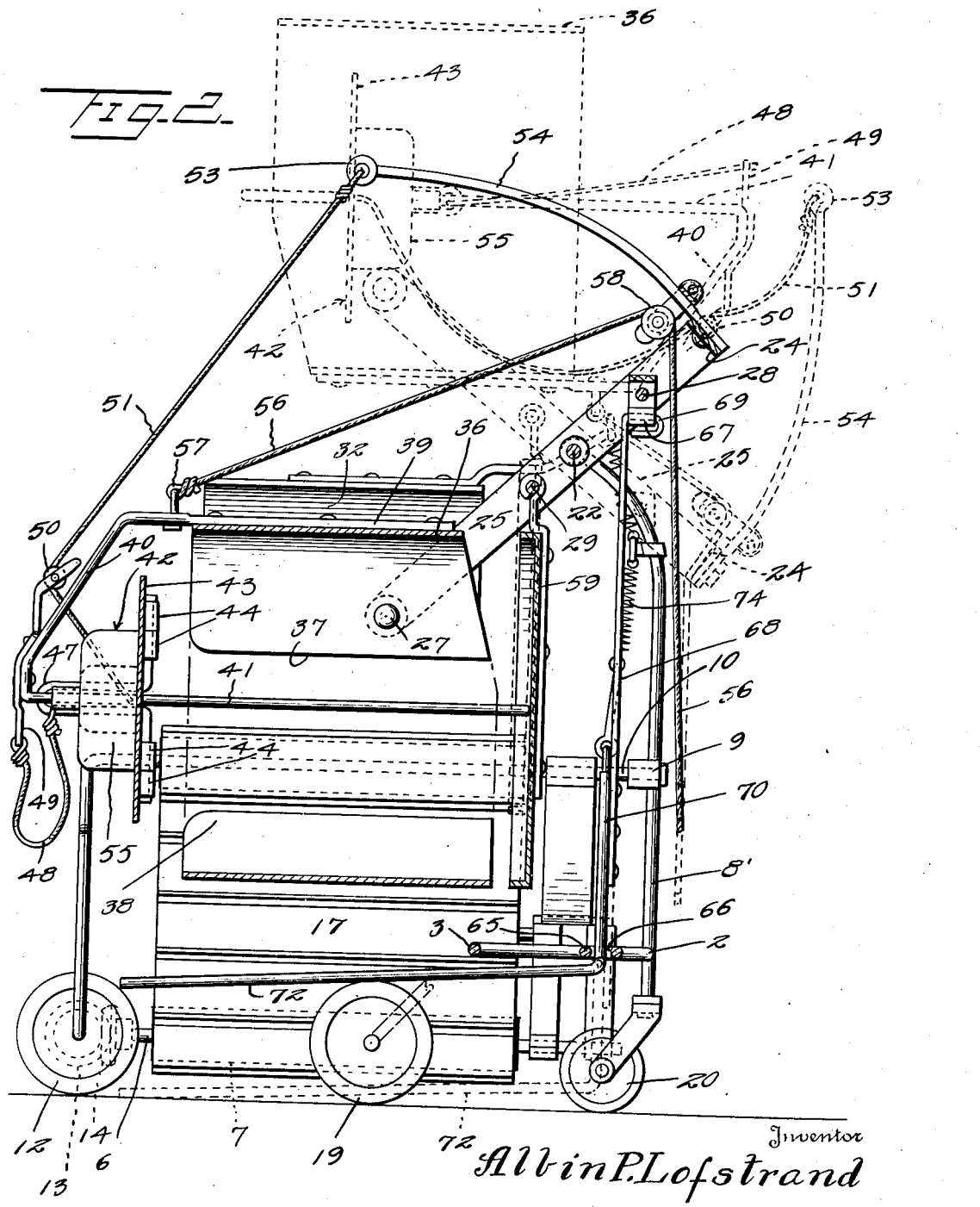

Aug. 12, 1941.　　　A. P. LOFSTRAND　　　2,252,346
GRAIN SHOCKER
Filed April 23, 1940　　3 Sheets-Sheet 3
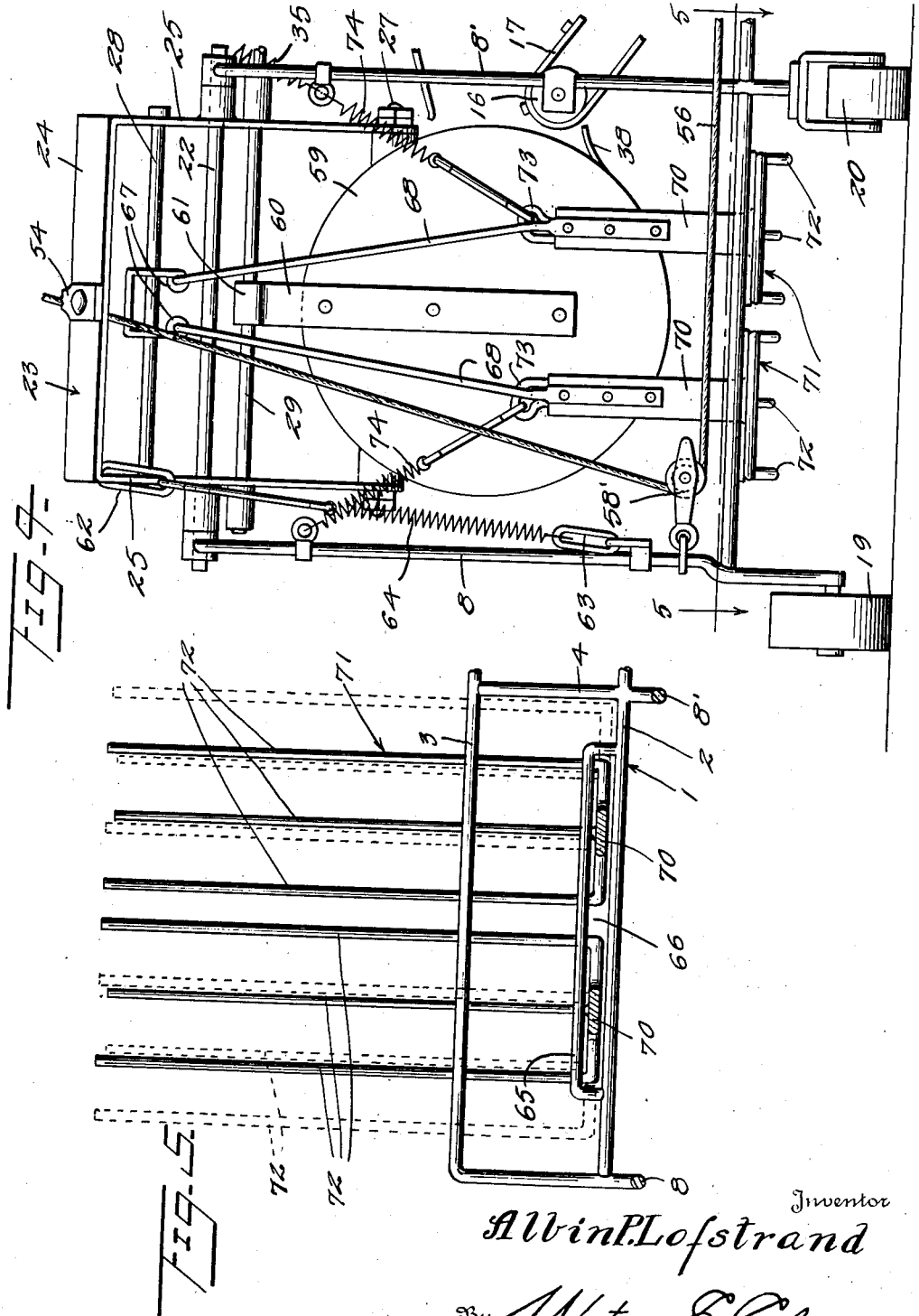
Inventor
Albin P. Lofstrand
By Watson E. Coleman
Attorney Patented Aug. 12, 1941

2,252,346

UNITED STATES PATENT OFFICE 2,252,346

GRAIN SHOCKER

Albin P. Lofstrand, Chicago, Ill.

Application April 23, 1940, Serial No. 331,224

10 Claims. (Cl. 56—419)

This invention relates generally to the class of agricultural implements and pertains particularly to a machine for grouping and shocking sheaves of wheat, corn or the like.

The primary object of the present invention is to provide a grain shocking machine designed to be used in association with a binder machine, which will function to arrange the shock on the ground with the butt ends of the shocks spread apart so that the shock will remain firmly fixed and cannot be upset or knocked over by cattle or disturbed by the wind.

Another and more specific object of the invention is to provide in a shocker, a novel means of collecting the bound sheaves of grain in a group and up-ending the group so as to stand the same on the ground, means being associated with the grouping means for the bound sheaves, for holding the tops of the bound sheaves together as they are deposited in vertical position upon the ground and while the lower ends or butt ends thereof are being spread apart so that the shock, when released, will be fairly tightly arranged at its top and will be spread out at its bottom to form a stable mass.

Another object of the invention is to provide in a grain shocker of the character described, a novel receiving unit onto which the shocked grain is deposited from the receptacle into which it is discharged from the binder, which unit lowers the shock to the ground and at the same time spreads apart the butt ends of the sheaves so as to form the shock in the desired manner.

A further and more specific object is to provide in a shocker of the character described, a novel mounting or support for the receiver into which the bundles of grain are discharged from a binder, and for the depositing unit or forks by which such depositing unit is lowered and shifted after the receiver has discharged the shocked grain onto the forks, to effect the depositing of the shock onto the ground smoothly and with the butt ends thereof spread out in the manner stated.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 illustrates a view in rear elevation of the shocker machine embodying the present invention.

Fig. 2 is a vertical longitudinal section through the machine taken substantially on line 2—2 of Fig. 1 showing the receiver cylinder in horizontal or loading position and showing the cylinder in dotted outline in the raised position which it assumes when the shock depositing forks are lowered to the ground for the discharge of the shock.

Fig. 3 is a longitudinal sectional view through the receiver cylinder with the latter in vertical position, showing the arrangement of the shock top holding mechanism as the shock is being released from the cylinder.

Fig. 4 is a view in front elevation of the machine.

Fig. 5 is a horizontal section taken substantially on the line 5—5 of Fig. 4.

Referring now more particularly to the drawings, it will be seen that the machine embodying the present invention comprises an elongated horizontal transversely disposed frame 1 which includes the front and rear transverse bars 2 and 3, respectively, and the longitudinally extending side bars 4. The front and rear bars extend laterally to one side of the machine and support a bearing 5 in which is rotatably mounted an end of a longitudinally extending shaft 6. On this shaft is supported a suitable endless conveyor roller 7 which is shown in dotted outline in Fig. 1 only.

The horizontal frame 1 supports the two vertical standards 8 and 8' which extend upwardly from the front bar of the frame, as shown in Fig. 2, and the standard 8' which is upon the side of the machine nearest the shaft 6, carries a box 9 in which is secured an end of a horizontal bar 10 extending longitudinally of the machine in parallel relation with and at a plane above the shaft 6, the opposite end of this bar extending downwardly and laterally, as indicated at 11 in Fig. 1, toward the rear end of the shaft 6. The free outer or lateral end of the bar 11 passes through and is supported by a wheel 12. The outer side of this wheel 12 has secured thereto the bevel gear 13 while the rear end of the shaft 6 has a similar gear 14 meshing with the gear 13. Any suitable means may be employed for supporting the rear end of the shaft 6, as for example, the lateral end of the bar 11 may pass freely through the gear 13 and support a bearing sleeve 15 in which the end of the shaft 6 positions.

The rearwardly extending bar 10 has rotatably supported thereon an endless conveyor roller 16 and this roller is connected with the roller 7 by the conveyor belt 17 which receives bundles of the grain or sheaves from a binder machine.

The frame 1 is provided with a downwardly extending arm 18 upon the side opposite from the shaft 6, which arm at its lower end is pivotally coupled with a supporting wheel 19. At the inner end of the frame below the idler roller 16 and at the forward side of the machine, a castor wheel 20 is located and connected with the frame, as shown in Figs. 1 and 2.

The upper end of each of the standards 8—8' carries a sleeve 21 and these sleeves receive and support the transversely extending suspension bar 22. As shown in Fig. 2, the upper ends of the standards 8—8' are curved to extend rearwardly so that the bar 22 is supported substantially above the center of the frame 1.

Rockably supported upon the bar 22 is the frame 23 which comprises the transverse top bar or yoke portion 24 and the downwardly and rearwardly extending arms 25, each of which intermediate its ends carries a bearing sleeve 26 through which the bar 22 passes, thus permitting the frame 23 to rock on the hanger bar. The rocking frame 23 is, as shown in Fig. 1, substantially U-shaped and in inverted position and the lower or free end of each arm 25 thereof carries a trunnion pin 27.

Extending transversely of the frame 23 above the hanger bar 22 is a fork supporting bar 28 while upon the opposite side of the bar 22 from this fork bar 28 there extends transversely of the frame 23, a rod 29, one end of which extends laterally a substantial distance beyond the frame 23 and has secured thereto the rearwardly extending arm 30 to which is attached a guide shield indicated generally by the numeral 31. This shield lies directly above the conveyor 17 and consists of a relatively wide sheet of metal which is shaped to have the circular portion 32 which extends lengthwise of the machine and to the upper edge of which the bar 30 is attached, and the grain bundle contacting lip portion 34 which has its long edge directed inwardly toward the longitudinal center of the machine and lying above and inwardly with respect to the conveyor roller 16.

The arm 30 is joined to the adjacent standard 8' by a spring 35 which, being connected to the end of the arm which is pivotally joined to the rod 29, normally exerts a pull upon the arm 30 tending to hold the shield 31 in a desired horizontal position but permitting the shield to have limited up and down movement with respect to the conveyor.

The numeral 36 designates the shock forming cylinder which is open at its front and rear ends and which is provided with a relatively wide longitudinal opening on the side nearest the discharge end of the conveyor 17 or adjacent to the roller 16 of the conveyor. One longitudinal edge of the side opening for the cylinder, which opening is indicated by the numeral 37, is shaped to form the out-turned lip 38, which is located in close proximity to the discharge end of the conveyor and below the top run thereof, while the opposite or upper edge of the opening 37 is substantially in the horizontal plane of the free longitudinal edge of the lip 34 of the shield 31.

The cylinder is held normally in the position stated with respect to the discharge end of the conveyor by the attachment of the trunnions 27, carried at the free ends of the arms of the frame 23, with its sides above the plane of the axial center.

Secured longitudinally of the top side of the cylinder 36 is a bar 39 which extends beyond the rear end of the cylinder and downwardly toward the axial center forming the arm 40. The lower end of the arm 40 terminates in the cylinder axis rod 41, which passes forwardly through the axial center of the cylinder to and slightly beyond the forward end of the cylinder. This axis rod provides a support for a shock head holding or forming unit which is indicated as a whole by the numeral 42 and which comprises two semi-circular plates 43, each of which is provided on its straight edge with a pair of hinge ears 44.

The axis rod 41 carries a slide 45 and to this slide is secured a transversely extending pintle rod 46 which extends through the alined hinge ears 44 of the two semi-circular plates 43, thus supporting these plates so that they may come into a common plane transversely of the rod 41 to form a disk substantially closing the rear end of the cylinder or they may swing down into the cylinder into side by side relation, as shown in Fig. 3, when the cylinder is oscillated to a vertical position, which position constitutes the second position for the cylinder in the process of operating the machine. The pintle 46 is here shown as being centrally offset to form an eye 47 which is attached to the slide 45. However, it will be obvious that the pintle may constitute a straight member extending across the slide 45 and that the eye 47 may be formed separately and attached to the slide, if desired. This eye 47 forms a terminal to which one end of a movement limiting cord 48 for the plates 43, is attached, the other end of the cord being suitably connected, as indicated at 49, with the outer or rear end of the arm 40.

To the end of the arm 40 there are secured two guides here illustrated as being in the form of pulley wheels 50. These wheels are supported for rotation upon alined axes extending transversely of the arm 40 and across each pulley 50 passes a pull cord 51 which has an end secured, as indicated at 52, to the rear side of a plate 43. The other ends of the pull cords 51 are attached to the eye 53 which is formed in the end of the suspension arm 54 which is coupled to the central part of the yoke portion 24 of the oscillating frame 23 and extends upwardly and rearwardly of the machine, as shown in Fig. 2.

Each of the plates 43 at its inner or straight edge is provided with an integral right angularly disposed wing 55. These wings come into parallel relation upon opposite sides of the sleeve or slide 45 when the cylinder 36 is in its normal horizontal position and the plates 43 are at the rear end of the axis rod 41, and thus maintain the plates 43 in a common plane so as to provide the previously described disk which closes the rear end of the cylinder.

The cylinder 36 is maintained in horizontal position, its normal position, by means of the trip cord 56 which is attached at one end to the bar 39 adjacent the rear end of the cylinder, as indicated at 57, and extends upwardly and forwardly across a pulley guide 58 which is supported at the central part of the oscillating frame 23 upon the forward end of the suspension arm 54, as shown in Fig. 2, and then passes downwardly as shown in Fig. 4, and is suitably guided, as by a pulley 58' to extend to an operator for the machine who may be at one side thereof as, for example, upon the adjacent binder, not shown.

The rod 29, which is supported upon the frame 23, normally at a lower elevation than the hanger bar 22, suspends at the forward end of the cylinder 36 the cover plate 59. As shown most clearly in Fig. 4, this plate is in the form of a disk having a strap 60 secured to its forward side and extending upwardly and terminating in a sleeve 61 through which the bar 29 passes, but it will be obvious that any other suitable means may be employed for swingingly suspending the plate at the forward end of the cylinder.

The oscillating frame 23 is maintained in a normal position so as to support the cylinder in its normal horizontal position, by the provision of a yieldable coupling between the upper end of the oscillating frame and the lower end of one of the standards here shown as being the standard 8. As shown most clearly in Fig. 4, this coupling between the standard and the frame 23 comprises upper and lower links 62 and 63, respectively, which are coupled together by a contractile spring 64. The spring 64 has the proper tension or its attachment to the standard 8 is adjusted so that it will be given the proper attention, to hold the upper end of the frame 23 in the position in which it is shown in Fig. 2, so that the cylinder will normally maintain a horizontal position with the open side 37 suitably disposed to receive bundles of grain from the carrier 17 after such bundles have been tied and delivered from a binder.

The base frame 1 of the machine is provided upon the rear side of the front bar thereof with a short guide bar 65 which is held in spaced parallel relation with the bar 2, so as to form the enclosed guide area 66 which extends transversely of the machine.

The fork supporting bar 28, which is mounted upon the frame 23 above the hanger bar 22, supports two spaced parallel bearings or bearing sleeves 67 which lie in relatively closely spaced relation at opposite sides of the longitudinal center of the machine and are directed longitudinally of the machine. Each of these bearing sleeves supports an elongated link 68, the upper end of which is angularly turned and extended through the sleeve, as indicated at 69, Fig. 2, so that the link may have free swinging movement transversely of the machine. At its lower end each link is attached to the upper end of the vertical neck portiton 70 of a fork, which is indicated generally by the numeral 71. Each of these forks is of substantial length and is horizontally disposed to extend lengthwise of the machine, the neck portion 70 of each fork being extended through the guide 66 and attached to an end of the underlying fork, each of which forks is made up of tines 72, as shown in Fig. 5. The tines, or the forks, are of sufficient length to extend beyond the rear end of the cylinder 36 for the purpose hereinafter described.

Connected with each fork neck 70, as indicated at 73, is an eye to which is coupled an end of a contractile spring 74. These springs extend upwardly and outwardly from necks 70 to which they are attached and are connected at their other ends to the adjacent standards 8—8', as shown in Fig. 4. Each of these springs is normally relaxed so that when the cylinder is in its normal horizontal position, the forks 70 will be permitted to gravitate together to assume the relative positions in which they are shown in Fig. 5.

In the operation of the machine, the bound sheaves of grain, indicated at 75, are carried upwardly on the conveyor 17 and discharged therefrom in horizontal position through the opening 37 into the cylinder 36. When the cylinder has become filled, the attendant of the machine pulls the trip cord 56. Previously, as will be readily understood from a consideration of Fig. 2, the bundles of grain will lie between the plates 43 and 59, the plates 43 being alined to form a disk at the rear end of the cylinder and the plate 59 closing the forward end of the cylinder to prevent the bundles from shifting forwardly as the machine operates. Upon pulling the cord 56, the cylinder will be oscillated upon the trunnions 27 to the vertical position in which it is illustrated in Fig. 3, and the bundles of grain will slide downwardly onto the forks 71, which lie below the cylinder. As the cylinder assumes the vertical position or moves to this second operating position, the semi-circular plates 43 will drop down upon the tops of the bundles and will tend to hold the tops together when the shock is set up on the forks. The frame 23 will, during this swinging of the cylinder to its second position, maintain its normal downwardly and rearwardly inclined position.

The operator then exerts a further pull upon the trip cord and in so doing, since the cylinder cannot be oscillated further, exerts a downward pull upon the front raised end of the oscillating frame 23, causing the entire frame to oscillate upon the hanger bar 22. This swings the forward end of the frame 23 to the lowered position in which it is shown in dotted outline in Fig. 2 and raises the cylinder to the position in which it is shown in this figure. At the same time, the suspension links 68 for the forks, are lowered, allowing the forks to go down toward the ground, carrying with them the supported shock of grain. As the forks descend, strain will be placed upon the springs 74 which are connected with the upper ends of the necks 70 and in resisting this strain or pull, the springs 74 will pull the forks toward the sides of the machine, thereby separating the forks and at the same time spreading out or enlarging the bottom of the shock of grain. When the forks have reached their lowered positions, their lateral movement being limited by the guide area 66 through which the necks 70 extend, they will be in relatively close proximity to the ground, as shown in Fig. 2, or may actually touch the ground at their rear ends. When this occurs, the butt ends of the sheaves of grain will engage the ground and as the machine is moving forward, they will drag on the ground and be slid off of the rear ends of the fork tines.

Upon releasing the trip cord 56, the oscillatable frame 23 will swing back to the position in which it is shown in Fig. 2, and the cylinder will drop or swing back to its horizontal position.

When the cylinder first swings to its vertical position or to its second operative position, the pull cords for the plates 53 will be slackened, thus permitting the plates to swing together and allowing the plates to slide down on the axis rod 41 toward the now lower end of the cylinder and following the tops of the bundles of sheaves. When the cylinder is allowed to drop back to its horizontal position after the dumping operation, it will be seen that the pull cords 51 will be tightened up and this will cause the follower plates 43 to be pulled back to the rear end of the axis rod and also to be straightened out so as to extend transversely of this rod and thus be in proper position to permit additional bundles of grain to be discharged into the cylinder from the conveyor 17.

The movement limiting cord 48 which is connected with the slide 45 merely checks the plates 43 when they reach the bottom or lower end of the cylinder after it has been turned to vertical position.

The guide plate 31 and particularly the tongue portion 34 thereof functions to prevent the bundles of grain riding up against the upper edge of the opening 37 after several bundles have been introduced into the cylinder and thus causes the bundles to be forced by the conveyor against those bundles which are already in the cylinder so that the latter bundles will be moved around in the cylinder and the cylinder may be properly filled.

It will be readily apparent that with the machine herein described, the bundles of grain, when stacked to form a shock, will be deposited on the ground with their butt ends separated so that the bundles will lean toward the center of the shock and will maintain the desired standing position.

What is claimed is:

1. A grain shocker, comprising a receiver into which bundles of grain may be deposited in side by side relation, means facilitating the movement of the receiver into a position to discharge the bundles as a group from the receiver in vertical position, means onto which the bundles are deposited comprising laterally separable supports, and means for shifting said supports laterally away from one another as the supports are drawn from beneath the bundles for separating the ends of the bundles of the group outwardly from the center of the group.

2. A grain shocker, comprising a movable frame, a receiver movably supported on the frame into which bundles of grain may be deposited in side by side relation, means for moving the receiver to a position for the discharge of the bundles downwardly therefrom in vertical position, means carried by the frame and disposed beneath said bundle receiver onto which the bundles are deposited, and means for shifting the last-mentioned means downwardly and laterally to deposit the butt ends of the bundles on the ground and to spread such ends laterally.

3. A grain shocker, comprising a movable frame, a pair of fork members suspended substantially horizontally from said frame in side by side relation, means for depositing upon said fork members in upright position bundles of grain to be shocked, and means for lowering and laterally shifting said forks for the depositing of the shocked bundles onto the ground while the frame is moving and for spreading the lower ends of the bundles while being deposited.

4. A grain shocker, comprising an ambulatory support, a pair of relatively long forks suspended upon said support and extending substantially horizontally above the ground, said forks being designed to have bundles of grain disposed in shocked position thereon, means for lowering said shocks into close proximity to the ground, and means for effecting the lateral shifting of the forks as the same are lowered.

5. A grain shocking machine, comprising a supporting structure including a horizontal bar, a pair of members suspended from said bar for lateral swinging movement, a pair of forks each supported by one of said members, said forks being disposed in side by side relation and substantially horizontally, means facilitating the lowering of said bar and the members suspended therefrom to dispose said forks into close proximity to the ground, and means connected with said suspended members for drawing the same laterally during lowering of the bar to effect the separation of the forks.

6. A grain shocker, comprising an ambulatory support, including a pair of vertical standards, a bar connecting said standards, a frame supported for oscillation upon the bar, means carried by the frame for receiving bundles of grain in horizontal position, said means being shiftable for disposing said bundles in vertical position to discharge the same downwardly in a shock, a receiving unit carried by the support and disposed beneath the bundle receiving means and onto which said shock is deposited, means coupling said receiving means with the frame whereby upon oscillation of the frame said receiving means will be lowered to the ground, and means forming a part and a function of the receiving means for spreading laterally the ends of the shocked bundles as said receiving means is withdrawn from beneath the bundles.

7. An ambulatory structure, including a pair of upright members, a bar supported by said members, a frame oscillatably supported upon the bar, a cylinder supported by said frame with its longitudinal axis horizontally disposed, the cylinder being oscillatable upon the frame and having an open side for the reception of grain bundles, means for oscillating said cylinder to a vertical position for the discharge of the grain bundles downwardly in a shock, a bar carried by the frame, means for rocking the frame to lower the bar, and a pair of forks suspended from the last-mentioned bar and extending beneath the cylinder to have said grain shock deposited vertically thereon, said forks being lowered to the ground upon the oscillation of the frame to facilitate shifting the shock from the forks.

8. An ambulatory structure including a pair of upright members, a bar supported by said members, a frame oscillatably supported upon the bar, a cylinder supported by said frame with its longitudinal axis horizontally disposed, the cylinder being oscillatable upon the frame and having an open side for the reception of grain bundles, means for oscillating said cylinder to a vertical position for the discharge of the grain bundles downwardly in a shock, a bar carried by the frame, means for rocking the frame to lower the bar, a pair of forks suspended from the last-mentioned bar and extending beneath the cylinder to have said grain shock deposited vertically thereon, said forks being lowered to the ground upon the oscillation of the frame to facilitate shifting the shock from the forks, and means for spreading said forks laterally simultaneously with the lowering of the same for effecting the spreading of the ground engaging end of the shock.

9. An ambulatory support, including a pair of spaced standards, a hanger bar supported horizontally between the standards, a frame rockably supported upon the bar, a cylinder supported by the frame with its long axis normally horizontal and below the hanger bar, the cylinder being provided with a side opening to receive bundles of grain in a horizontal position, a cover member for each end of the cylinder, one of said cover members being in two hingedly coupled parts, means supporting the said one of the cover members for movement longitudinally through the cylinder, means for oscillating the cylinder to a vertical position in which the said one of the cover members moves downwardly through the cylinder, with the two parts thereof gravitating toward a folded relation, the other one of the cover plates maintaining its initial position upon the oscillation of the cylinder, a pair of suspension members pivotally coupled with the frame above the bar, means for oscillating the cylinder to a vertical position, means for oscillating the frame to lower said suspension members, an elongated fork carried by and extending from each suspension member beneath the cylinder, the forks being lowered to the ground upon oscillation of the frame, said suspension members being mounted for lateral swinging movement, and means for effecting the lateral swinging of said suspension members for the separation of the forks when the forks are lowered to the ground.

10. A grain shocking machine, comprising an ambulatory support, a unit mounted upon said support for oscillation on a horizontal axis, said unit normally having an upwardly and forwardly inclined position, a grain bundle receiving cylinder pivotally suspended upon the lower end of said unit and normally having a horizontal position, said cylinder having a side opening for the reception of the grain bundles horizontally, means for oscillating the cylinder on the unit to a vertical position for the downward discharge of a shock of bundles from the cylinder, an upwardly yielding guide member disposed at a side of the cylinder and adjacent the top part of the opening for guiding bundles through the opening into the cylinder, a pair of members suspended from the unit above the oscillation axis thereof and adapted to swing laterally, an elongated fork extending rearwardly from each suspended member beneath the cylinder, said forks being normally in close relation to receive a grain shock from the cylinder, means for oscillating the unit to lower the forks to the ground, and means for yieldingly drawing said forks apart as the same are lowered to the ground.

ALBIN P. LOFSTRAND.